US010730555B2

(12) United States Patent
Minoiu Enache et al.

(10) Patent No.: US 10,730,555 B2
(45) Date of Patent: Aug. 4, 2020

(54) SYSTEM FOR CONTROLLING THE STEERING MEANS OF A MOTOR VEHICLE IN CASE OF AN IMMINENT COLLISION WITH AN OBSTACLE

(71) Applicant: RENAULT s.a.s., Boulogne-Billancourt (FR)

(72) Inventors: Nicoleta Minoiu Enache, Versailles (FR); Mihai Chirca, Paris (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 182 days.

(21) Appl. No.: 15/764,669

(22) PCT Filed: Sep. 28, 2016

(86) PCT No.: PCT/FR2016/052458
§ 371 (c)(1),
(2) Date: Mar. 29, 2018

(87) PCT Pub. No.: WO2017/055738
PCT Pub. Date: Apr. 6, 2017

(65) Prior Publication Data
US 2018/0290686 A1 Oct. 11, 2018

(30) Foreign Application Priority Data
Sep. 30, 2015 (FR) ...................... 15 59256

(51) Int. Cl.
*A01B 69/00* (2006.01)
*B62D 6/00* (2006.01)
(Continued)

(52) U.S. Cl.
CPC ......... *B62D 15/0265* (2013.01); *B60W 30/09* (2013.01); *B60W 30/12* (2013.01);
(Continued)

(58) Field of Classification Search
CPC ... B62D 15/0265; B60W 30/09; B60W 30/12; B60W 2420/905; B60W 2550/10; B60W 2710/207
(Continued)

(56) References Cited

U.S. PATENT DOCUMENTS

2010/0235035 A1* 9/2010 Nishira .................. B60T 7/22
701/31.4
2013/0226407 A1 8/2013 Rentschler et al.

FOREIGN PATENT DOCUMENTS

DE 10 2012 202 916 A1 8/2013

OTHER PUBLICATIONS

French Search Report and Written Opinion dated Jul. 11, 2016 in French patent Application No. 1559256, 9 pages.
(Continued)

*Primary Examiner* — Mahmoud S Ismail
(74) *Attorney, Agent, or Firm* — Oblon, McClelland, Maier & Neustadt, L.L.P.

(57) ABSTRACT

A system controls steering of a motor vehicle in case of an imminent collision with an obstacle. The vehicle includes a system to locate the vehicle relative to its lane and to determine a lateral deviation from the lane center, a determination unit for determining the presence of obstacles, a gyrometer for measuring the rotation speed of the vehicle, and a steering device, the steering angle of which can be controlled based on the measurement of a steering angle sensor or the steering torque of which can be controlled. The control system includes a perception device for determining the maximum lateral distance available for movement of the vehicle relative to obstacles, a decision device for transmitting a correction request based on the trajectory of the
(Continued)

vehicle and on the lateral maximum distance, and an intervention device for controlling the steering device to correct the trajectory of the vehicle.

7 Claims, 1 Drawing Sheet

(51) Int. Cl.
| | |
|---|---|
| *B62D 11/00* | (2006.01) |
| *B62D 12/00* | (2006.01) |
| *B63G 8/20* | (2006.01) |
| *B63H 25/04* | (2006.01) |
| *G06F 7/00* | (2006.01) |
| *G05D 1/00* | (2006.01) |
| *G06F 17/00* | (2019.01) |
| *B62D 15/02* | (2006.01) |
| *B60W 30/09* | (2012.01) |
| *B60W 30/12* | (2020.01) |
| *G01M 17/00* | (2006.01) |

(52) U.S. Cl.
CPC ... *B60W 2420/905* (2013.01); *B60W 2554/00* (2020.02); *B60W 2710/207* (2013.01)

(58) Field of Classification Search
USPC .................................................. 701/44, 31.4
See application file for complete search history.

(56) References Cited

OTHER PUBLICATIONS

International Search Report and Written Opinion dated Jan. 30, 2017 in PCT/FR2016/052458 (with English translation of search Report only), 8 pages.
Minoiu-Enache, N., "Assistance Préventive á la sortie de voie", Thèse de doctorat, XP055286945, Retrieved from the Internet: URL: http://www.biblio.univ-evry.fr/theses/2008/2008EVRY0046. pdf Nov. 17, 2008, pp. 1-307 with cover pages.

* cited by examiner

SYSTEM FOR CONTROLLING THE STEERING MEANS OF A MOTOR VEHICLE IN CASE OF AN IMMINENT COLLISION WITH AN OBSTACLE

BACKGROUND

The invention relates to the technical field of driving assistance for automobile vehicles, and more particularly, assistance for the avoidance of obstacles.

Accidents by unintentionally straying from a traffic lane, due to the lack of attention of the driver, continue to represent a significant fraction of road traffic accidents. Equipped with active safety means, some vehicles are capable of evaluating their path and of recognizing the environment in order to determine a measurement of risk associated with the situation. Actions may then be undertaken, automatically or shared with the driver, in order to keep the vehicle within its traffic lane for cases of lack of attention of the driver, of falling asleep or of feeling unwell. This is the active safety function "Lane Keeping Assistance" (LKA) or "Lane Departure Avoidance" (LDA).

Until now, the decision for activation of such a driving assistance system only took into account a possible departure from the traffic lane.

From the prior art, the following documents are known dealing with the problem of side or front collision avoidance when the vehicle leaves its traffic lane.

The documents EP1790542 (Nissan Motors), KR100851120 (Hyundai Motor) and U.S. Pat. No. 7,580,785B2 (Nissan Motor) describe applications of the type "Lane Departure Avoidance" or "Lane Keeping Assist"

In this type of application, the lane markings are detected and an intervention by steering the wheels or by differential braking is undertaken in order to avoid the departure from the lane. However, in these documents, lateral obstacles are not taken into account.

The documents EP 2 288 533 B1, EP 1 726 481 B1, U.S. Pat. No. 8,111,147 B2, and GB (11)2512317 (13)A 2 describe applications of type "Blind Spot Intervention" or "Lane Change Assist". In this type of application, the desire of the driver to change lane is determined through the activation of the indicators, and it is estimated whether the maneuver is dangerous by determining whether a vehicle is present in a blind spot, or is approaching with a high relative speed. In such a case, a path correction is carried out through steering or differential braking. In these documents, the fixed lateral obstacles are not taken into account. Furthermore, the objective is only to assist the driver in the case of an intentional change of lane and not to intervene when there is an unintentional departure from the traffic lane.

In the preceding applications, the notion of a system for avoidance of an unintentional departure from a lane, taking the true dangers of lateral collision into account, does not exist.

There accordingly exists a need for a system for controlling the steering means of the vehicle in the case of imminent collision taking lateral obstacles into account in an effective manner and operating in a transparent manner for the driver.

Indeed, activations that are too frequent may annoy the driver and cause him/her to disable the function, which reduces its efficacy for preventing accidents.

Moreover, in some situations, the lane that is navigable in complete safety narrows all the more if there are obstacles on the side of the road. For example, the risk for the vehicle when a white/yellow line is crossed is different if, beyond the latter, the road surface comprises 80 cm of tarmac or if the road surface only comprises 20 cm of tarmac followed by a ditch or by a safety barrier.

BRIEF SUMMARY

The subject of the invention is a system for controlling the steering means of an automobile vehicle in the case of imminent collision with an obstacle. The vehicle comprises a system designed to locate the vehicle with respect to its traffic lane and designed to determine a lateral shift with respect to the center of the lane at a sighting distance and a relative heading angle of the vehicle, a means of determination associated with sensors, designed to determine in real time the presence of obstacles, in a lateral position with respect to the vehicle, and/or in a frontal position and in relative movement toward the vehicle, a 3-axis rate sensor designed to measure the speed of rotation of the vehicle and a direction of the vehicle, able to be controlled in steering angle as a function of the measurement of a steering angle sensor or a direction of the vehicle able to be controlled in steering torque.

The control system comprises a detection means designed to assess the position of the obstacles and to determine the maximum lateral distance available for the movement of the vehicle with respect to these obstacles, a decision means designed to generate a request for correction as a function of the path of the vehicle and of the maximum lateral distance and an intervention means designed to control the steering of the vehicle in order to correct the path of the vehicle.

The detection means may be designed to determine the position of the obstacles by shape recognition, then to determine a distance for lateral displacement of the vehicle as a function of the rate of yaw, of the relative heading angle between the axis of the vehicle and the tangent to the reference path, of the lateral shift between the axis of the vehicle and the tangent to the path in front of the vehicle, of the drift angle, of the distance from the center of gravity to the front axle, and of the sighting distance for the measurement of the lateral shift in front of the vehicle.

The decision means may be designed to generate a request for activation of a correction as a function of the position of the vehicle on the traffic lane with respect to the maximum lateral displacement of the vehicle on the lane determined by the detection means.

The decision means may be designed to continuously determine position correction gains, to store a first set from amongst the position correction gains corresponding to a value of lateral displacement lower than a value of maximum lateral displacement on the left side of the lane, to store a second set from amongst the position correction gains corresponding to a value of lateral displacement lower than a value of maximum lateral displacement on the right side of the lane, and to generate the request for activation of the correction for a deviation to the left, respectively to the right, when from amongst the first or the second set of gains, only one gain remains, the remaining gain being transmitted to the intervention means in order for the correction to be executed.

The decision means may be designed to determine position correction gains, to store a third set from amongst the position correction gains corresponding to a value of lateral displacement lower than a maximum distance with respect to the lane center, and to generate the request for activation of the correction when from amongst the gains of the third set, only one gain remains, the remaining gain being transmitted to the intervention means in order for the correction to be executed.

The intervention means may be designed to control the correction of the path of the vehicle as a function of the gain received of the decision means, the correction being sent to a means for calculating the steering angle in relation with the steering of the vehicle in the form of a steering angle setpoint, or the correction is sent to a means for controlling the assistance to the steering in the form of a steering torque setpoint.

The direction of the vehicle may be changed by means of a steering column directing the front wheels of the vehicle, or by means of a system for steering the rear wheels of the vehicle, or by the differential braking of at least one of the four wheels of the vehicle or by another means designed to change the direction of the vehicle. In the following descriptions, a steering column for the front drive wheels will be taken as example, the other embodiments of the actuation remaining perfectly possible.

BRIEF DESCRIPTION OF THE DRAWINGS

Other aims, features and advantages of the invention will become apparent upon reading the following description, given solely by way of non-limiting example and with reference to the appended drawings, in which.

DETAILED DESCRIPTION

The following notations are defined:
m (kg): Total mass of the vehicle
Iz (N·m): Inertia of the vehicle about a vertical axis passing through its center of gravity CG
lf (m): Distance from CG to the front axle
lr (m): Distance from CG to the rear axle
a(m): Wheelbase of the vehicle
cf (N/rad): Drift rigidity of the front wheels
cr (N/rad): Drift rigidity of the rear wheels
δf (rad): Angle that the front wheels make with the longitudinal axis of the vehicle
r (rad/s): Rate of yaw (speed of rotation of the vehicle about its center of gravity along a vertical axis)
Ψ (rad/s): Vehicle heading angle in an absolute reference frame
Ψd (rad/s): Heading angle of the tangent to the reference path in an absolute reference frame
ΨL (rad/s): Relative heading angle between the axis of the vehicle and the tangent to the reference path
yLCG (m): Lateral shift between the axis of the vehicle and the tangent to the path at the CG of the vehicle
yL (m): Lateral shift between the axis of the vehicle and the tangent to the path in front of the vehicle
ls (m): The sighting distance for the measurement of the lateral shift in front of the vehicle
β (rad): Drift angle (angle that the velocity vector of the vehicle makes with its longitudinal axis)
(vCG)v: Velocity vector of the vehicle at the center of gravity
v (m/s): Speed of the vehicle along the longitudinal axis
ρref (1/m): Curvature of the road
L: The width of the traffic lane
α (rad): Drift angle calculated by an observer
g: Acceleration due to gravity, considered equal to 9.81 m/s$^2$
ξv: Parameter describing the variation of the speed inside of the interval [vmin; vmax]
K: Real vector of dimension 1×4
P: Real matrix of dimension 4×4, defined to be positive and symmetrical.
Q: Real matrix of dimension 4×4, defined to be positive and symmetrical.
Q=P$^{-1}$: P Real matrix of dimension 4×4, defined to be positive and symmetrical.

The automobile vehicle is fitted with the following pieces of equipment:
a system for locating the vehicle with respect to its traffic lane (for example a camera), capable of determining a lateral shift with respect to the center of the lane at a sighting distance yL and a relative heading angle of the vehicle ΨL;
sensors, of the camera or radar type, and an associated means of determination designed to determine the presence of obstacles in real time. The parameters relating to the obstacles determined are the position of the obstacle in a reference frame with its origin fixed to the respective center of the sensor.
a 3-axis rate sensor designed to measure the speed of rotation of the vehicle.
a steering means of the vehicle able to be controlled in steering angle as a function of the measurement from a steering angle sensor or a steering means of the vehicle able to be controlled in steering torque.

Figure 1:
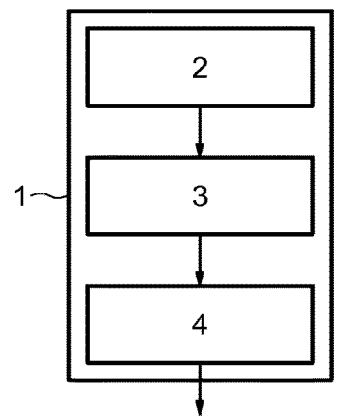
FIG. 1 illustrates the main elements of a system for controlling the steering means of an automobile vehicle in the case of imminent collision with an obstacle and FIG. 2 illustrates a driving situation of the automobile vehicle equipped with a system according to the invention.

The system 1 for controlling the steering means of the vehicle in the case of imminent collision comprises a detection means 2, a decision means 3 and an intervention means 4, such as illustrated in FIG. 1.

The detection means 2 is designed to assess the position of the lateral obstacles or the lateral distance with respect to a frontal obstacle coming toward the vehicle.

The decision means 3 is capable of analyzing whether a corrective action is necessary or not.

The intervention means 4 is designed to control the actuator in order to correct the path of the vehicle.

These three means may be localized in three different processing units or in the same processing unit.

The principles of the detection of lateral obstacles will now be described.

In order to ensure the safety of the vehicle and of its occupants, it is necessary to detect the position and the envelope of the obstacles together with the lateral and longitudinal distance between the vehicle and these obstacles. In addition, these obstacles need to be discriminated according to their speeds (static, dynamic).

It is interesting to note that certain cases of collision are not currently taken into account by the conventional LKA (for "Lane Keep Assist"). These cases occur when the critical line of lateral deviation is inside of the lane.

In one case, it is not sufficient to implement a lane tracking using the markings on the ground, but it must also be determined where the obstacles are and the appropriate avoidance decisions taken.

Figure 2:
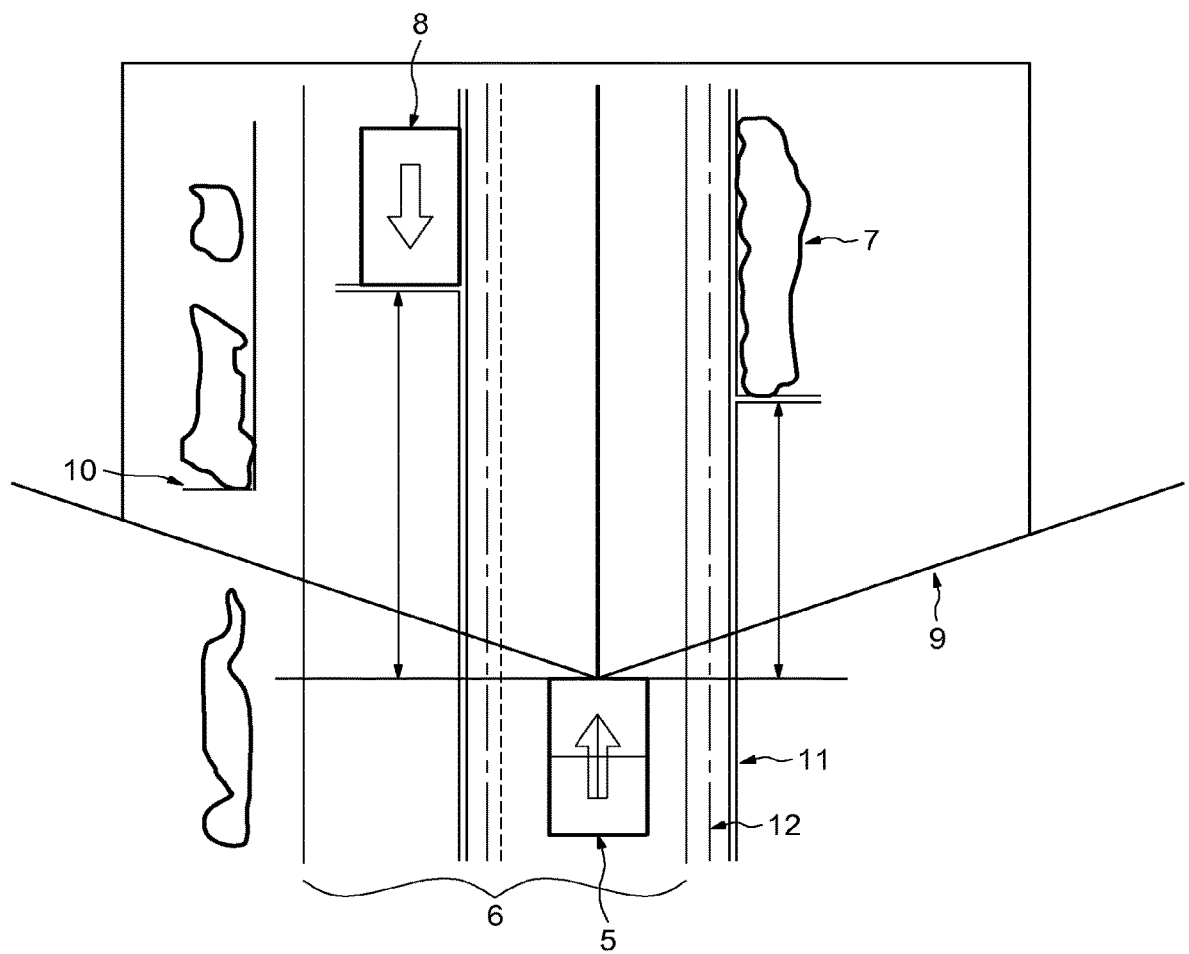

In addition, it is also necessary to take into account the obstacles that are not situated in a collision position, for example an obstacle situated outside of the lane, in order to define a minimum safety distance in such a manner that the vehicle moves over at the approach of this obstacle. FIG. 2 illustrates such a situation of the vehicle 5 whereby obstacles 7 are situated outside of the traffic lane 6, another vehicle 8 approaching from the opposite direction. It is then necessary to detect the envelope 10 of these obstacles and the lateral and longitudinal distance between the vehicle 5 equipped with the control system, the vehicle 8 approaching from the opposite direction and the obstacles 7. In addition, it is necessary to calculate the speed of these objects and to discriminate them according to their speed (static objects, dynamic objects). The collision limit 11 and the critical limit 12 can be observed. In the case of crossing these lines, the accident cannot be avoided.

For the calculation of the speed of the objects, this just needs a continuous calculation of the distance between our detection means and the objects. By also knowing the movement of our vehicle, hence of the detection means which is fixed onto the vehicle, the variation of movement of the objects within an interval of time may thus be determined.

Depending on the sensor used, the calculation of the distance is different. For example, radar systems may be used which allow distances to be directly measured without having to make an estimation. However, although radar systems exhibit excellent performance in the calculation of the distance, their performance leaves much to be desired in the determination of angles and hence of the lateral distances.

It is also possible to employ LIDAR (acronym for "Light Detection and Ranging") systems in a similar manner to radar systems. However, these are high-cost systems which is a limiting factor for the automobile industry.

Alternatively, the same camera as that employed for the detection of a change of lane may be employed. It is this latter case that will now be described.

For this purpose, the principles are posed for calculation of the distance between the vehicle and a point on the road based on an image acquired by an onboard camera.

The correspondence between a point in a two-dimensional space (image) and a point in a three-dimensional space (real world) is given by the following equation.

$$p = \begin{bmatrix} sx \\ sy \\ s \end{bmatrix} = \begin{bmatrix} * & * & * & * \\ * & * & * & * \\ * & * & * & * \end{bmatrix} \begin{bmatrix} X \\ Y \\ Z \\ 1 \end{bmatrix} = \Pi P_{3D} \quad \text{(Eq. 1)}$$

with:

X, Y, Z: the coordinates of the point in the three-dimensional space, in a fixed reference frame (referred to as absolute reference frame) in such a manner that Z=0 corresponds to the level of the road x, y: the coordinates of the point in the three-dimensional space, centered on the camera, calculated to within a scale factor s: a scale factor, $P_{3D}$: vector of homogeneous coordinates of the point in the three-dimensional space in an absolute reference frame $\Pi$: transfer or projection matrix expressed in a homogeneous form, p: vector of coordinates of the point in the three-dimensional space, centered on the camera, calculated to within a scale factor The transfer matrix $\Pi$ is decomposed in the following manner:

$$\Pi = M_I \times M_{Proj} \times M_O \times M_{Pos} \quad \text{(Eq. 2)}$$

with:

$$M_I = \begin{bmatrix} s_x & 0 & -t_x \\ 0 & s_y & -t_y \\ 0 & 0 & 1/f \end{bmatrix}$$

$$M_{Proj} = \begin{bmatrix} 1 & 0 & 0 & 0 \\ 0 & 1 & 0 & 0 \\ 0 & 0 & 1 & 0 \end{bmatrix}$$

$$M_O = \begin{bmatrix} R_{3 \times 3} & 0_{3 \times 1} \\ 0_{1 \times 3} & 1 \end{bmatrix}$$

$$M_{Pos} = \begin{bmatrix} I_{3 \times 3} & T_{3 \times 1} \\ 0_{1 \times 3} & 1 \end{bmatrix}$$

$R_{3 \times 3}$: Rotation matrix—three rows by three columns;
$T_{3 \times 1}$: Translation matrix—three rows by one column;
$0_{1 \times 3}$: Null vector—three rows by one column;
$0_{3 \times 1}$: Null vector—one row by three columns;

This matrix comprises the following information, known after a calibration phase.

The exact location of each camera within the vehicle is known; the rotation matrix R and the translation matrix T for each of the cameras is therefore known.

The matrix of intrinsic parameters $M_I$ is determined by calibration of each camera with a test pattern. Here, the reference method and tool in the field is mentioned: "Camera Calibration Toolbox for Matlab" published by Caltech University. This tool takes as input the dimensions of the rectangles composing the test pattern, the number of rows and columns in the test pattern and several shots of the test pattern from various positions. The algorithm yields the matrix of intrinsic parameters at the output.

If it is considered that the car is on a flat road and that points disposed on the latter are detected, the problem is simplified but remains dependent on the resolution of the image.

The coordinates (X, Y, Z) are then posed that define a point of the three-dimensional space complying with the postulate described hereinabove. The equations may be re-written in the following manner if the coordinate Z is zero. Indeed, the point is then situated on the road.

$$p = \begin{bmatrix} sx \\ sy \\ s \end{bmatrix} = \begin{bmatrix} * & * & * & * \\ * & * & * & * \\ * & * & * & * \end{bmatrix} \begin{bmatrix} X \\ Y \\ Z \\ 1 \end{bmatrix} = \Pi P_{3D} \quad \text{(Eq. 3)}$$

A point in the three-dimensional reference frame is well determined in the two-dimensional space using a single image if and only if this point is disposed on the road (which implies that Z=0). The scale factor(s) then disappear(s).

$$p = \begin{bmatrix} sx \\ sy \\ s \end{bmatrix} = \begin{bmatrix} x_1 \\ x_2 \\ x_3 \end{bmatrix} = \begin{bmatrix} p_{11} & p_{12} & p_{13} & p_{14} \\ p_{21} & p_{22} & p_{23} & p_{24} \\ p_{31} & p_{32} & p_{33} & p_{34} \end{bmatrix} \begin{bmatrix} X \\ Y \\ 0 \\ 1 \end{bmatrix} \quad \text{(Eq. 4)}$$

The transfer matrix $\Pi$ and the matrix of coordinates of the point in the three-dimensional space $P_{3D}$ may then be simplified since the coordinate corresponding to the direction Z is zero, which corresponds to the level of the road. The equation 4 may then be re-written in the following manner:

$$p = \begin{bmatrix} x_1 \\ x_2 \\ x_3 \end{bmatrix} = \begin{bmatrix} p_{11} & p_{12} & p_{14} \\ p_{21} & p_{22} & p_{24} \\ p_{31} & p_{32} & p_{34} \end{bmatrix} \begin{pmatrix} X \\ Y \\ 1 \end{pmatrix} \quad \text{(Eq. 5)}$$

A continuous tracking of the points of interest allows the calculation precision to be improved. The prior art comprises numerous examples of classification of objects allowing such a tracking. For the sake of the concision and the clarity of the present description, such examples will not be described.

The following description is only given in the framework taking into account the points complying with the constraint Z=0.

At the time t, all the points of interest in the image, in other words all the potential obstacles, are sought. For this purpose, an operator of the Harris type may be used comprising the following steps, for each point of interest: A cropped image is determined comprising the point of interest in the center.

The choice of the dimension of this cropped image is made in the step for calibration of the algorithm, and depends on the quality of the image and on the search algorithm for the cropped points/images. Dimensions in the range between 20×20 pixels and 50×50 pixels are generally used. The larger the cropped image, the more precise will be the comparison, but the comparison of the cropped images will require a longer processing time.

At the time t, the position of the point of interest is determined as a function of the cropped image corresponding to it.

Knowing the relative movement of the vehicle by virtue of the odometer and the position estimated at the time t, the position of the point of interest at the time t+dt is estimated if it belongs to the plane Z=0.

At the time t+dt, the cropped image comprising the point of interest is determined.

At the time t+dt, the position of the point of interest is determined as a function of the cropped image corresponding to it.

It is determined whether the estimated position of the point of interest at t+dt corresponds to the position of the point of interest determined as a function of the cropped image acquired at the time t+dt.

If such is the case, it is determined that the point of interest is situated at ground level, otherwise the point of interest is considered as situated higher or lower than the road.

This process is applied repeatedly and, in order to avoid false detections of objects, the previous responses are saved and only after a repeated confirmation of the result is the existence of an obstacle confirmed.

This method which is simple and already known is well used in the image processing community for the problem of 3D reconstruction of the environment. This function for calculating the distance to an object may perfectly well be replaced by another with a superior performance without compromising the overall operation of the system.

The result of the detection of the obstacles is a 3D position in the absolute reference frame which allows a longitudinal and lateral collision distance between the vehicle and the obstacle to be subsequently determined. Then, after the addition of a margin which may be calibrated as a function of the position of the obstacle with respect to the center of the lane, the critical distance Dmax is calculated by means of the equations described hereinbelow.

One objective is that of not exceeding the critical distance Dmax during the path correction phase in the case of unintentional departure from the traffic lane.

The evaluation of the maximum lateral displacement of the vehicle over the lane is carried out by a system for controlling the steering means of the vehicle in the case of imminent collision as illustrated in FIG. 1, designed to apply a path correction of the static state feedback type based on the vehicle model.

The doctoral thesis by N. Minoiu Enache "Assistance preventive a la sortie de voie", presented on Nov. 17, 2008 at the Université d'Evry Val d'Essonne comprises one example of a formula for calculating the maximum lateral displacement of the vehicle.

With the aim of modeling the vehicle, the following hypotheses are made.

The angles $\beta$, $\delta f$, are small such that the small-angle approximation may be applied to the trigonometric functions (sin(angle)≈angle and cos(angle)≈1).

The following is posed $(v_{CG})v=(v, v^*(\sin \beta), 0)^T$ and after the approximation for small angles, $(v_{CG})v \approx (v, v^*\beta, 0)^T$ is obtained, where $(v_{CG})v$: represents the velocity vector in the vehicle reference frame with the origin at the center of gravity of the vehicle.

v: represents the longitudinal speed of the vehicle.

$\beta$: represents the drift angle formed by the velocity vector of the vehicle with the longitudinal axis of the vehicle.

The lateral contact forces of the tires Fyf and Fyr vary linearly with the drifts of the tires $\alpha f$ and $\alpha r$ and as a function of the rigidities of the tires cf and cr: Fyf=cf*$\alpha f$ and Fyr=cr*$\alpha r$.

yL≤yL$_{CG}$+ls*ΨL is posed, where ΨL=Ψ−Ψd.

yL: lateral shift of the vehicle measured at a sighting distance, yL$_{CG}$: lateral shift of the vehicle measured at the center of gravity, Ψ: heading angle of the vehicle in an absolute reference frame, Ψd: heading angle of the desired path, respectively the axis of the lane $\Psi_L$: relative heading angle.

With these hypotheses, the vehicle is modeled by an equation of state according to the "bicycle" model, the vehicle being situated on an infinite plane. The corresponding state vector comprises the drift angle of the vehicle $\beta$ and the rate of yaw r. The equation of state thus obtained is as follows.

$$\begin{pmatrix} \dot{\beta} \\ \dot{r} \end{pmatrix} = \begin{pmatrix} a_{11} & a_{12} \\ a_{21} & a_{22} \end{pmatrix} \begin{pmatrix} \beta \\ r \end{pmatrix} + \begin{pmatrix} b_{11} \\ b_{21} \end{pmatrix} \delta_f \quad \text{(Eq. 6)}$$

$$a_{11} = -\frac{2(c_r + c_f)}{mv},$$

$$a_{12} = -1 + \frac{2(l_r c_r - l_f c_f)}{mv^2},$$

$$a_{21} = \frac{2(l_r c_r - l_f c_f)}{I_z},$$

$$a_{22} = -\frac{2(l_r^2 c_r - l_f^2 c_f)}{I_z v},$$

$$c_r = c_{r0}v, \quad c_f = c_{f0}v,$$

$$b_{11} = \frac{2c_f}{mv}, \quad b_{12} = 0,$$

-continued $$b_{21} = \frac{2c_l l_f}{I_z}, b_{22} = \frac{1}{I_z}.$$

The angle δf is the steering angle of the front wheels of the vehicle. It may be determined by measurement of the steering angle of the steering wheel of the vehicle.

The drift angle of the velocity vector β is obtained by means of an estimator. Such an estimator is known from the prior art, notably the document WO 2005/061305 describing such an estimation by means of a state observer.

The rate of yaw r is measured by the gyroscope of the vehicle.

The error in position of the vehicle with respect to the axis of the lane may be expressed as a function of the lateral shift with respect to the axis of the lane yL in front of the vehicle and of its relative heading angle $\Psi L$ with respect to the tangent to the axis of the lane. The positional error is given by the following system of equations:

$$\dot{\psi}_L = r - v\rho_{ref}$$

$$\dot{y}_L = v\beta + l_s r + v\psi_L, \quad \text{(Eq. 7)}$$

The relative heading angle $\Psi L$ and the lateral shift with respect to the axis of the lane in front of the vehicle yL may be obtained by processing of images from the onboard cameras, known from the prior art.

The curvature of the road pref is considered to be unmeasurable and taken into account as a perturbation of the system.

By grouping the elements presented in the equation 6 and the equation 7, the following model of the vehicle and of its positional error with respect to the axis of the lane is obtained.

$$\begin{pmatrix} \dot{\beta} \\ \dot{r} \\ \dot{\psi}_L \\ \dot{y}_L \end{pmatrix} = \begin{pmatrix} -\frac{2(c_f + c_r)}{mv} & -1 + \frac{2(c_r l_r - l_f c_f)}{mv^2} & 0 & 0 \\ -\frac{2(l_f c_f - l_r c_r)}{I_z} & -\frac{2(l_f^2 c_f - l_r^2 c_r)}{I_z} & 0 & 0 \\ 0 & 1 & 0 & 0 \\ v & l_s & v & 0 \end{pmatrix} \quad \text{(Eq. 8)}$$

$$\begin{pmatrix} \beta \\ r \\ \psi_L \\ y_L \end{pmatrix} + \begin{pmatrix} \frac{2c_f}{mv} \\ \frac{2l_f c_f}{mv} \\ 0 \\ 0 \end{pmatrix} \delta_f + \begin{pmatrix} 0 \\ 0 \\ -v \\ 0 \end{pmatrix} \rho_{ref}.$$

The inputs for this model are the steering angle of the front wheels δf and the curvature of the road pref.

At the output of this model, the complete state of the model of the vehicle x is obtained.

$$x = (\beta, r, \psi_L, y_L)^T \quad \text{(Eq. 9)}$$

The model of the equation Eq. 8 may be re-formulated by means of the following matrix equation:

$$\dot{x} = Ax + B_u \delta_f + B_\rho \rho_{ref} \quad \text{(Eq. 10)}$$

Henceforth, it is assumed that a static state feedback of the following form has already been synthesized by the pole placement method or another systems control method:

$$\delta_f = Kx = k_\beta \beta + k_r r + k_{\psi_L} \Psi_L + k_{y_L} y_L \quad \text{(Eq. 11)}$$

with $$K = [k_\beta, k_r, k_{\psi_L}, k_{y_L}]^T \quad \text{(Eq. 12)}$$

The representation of the vehicle system as a closed loop for LKA (for "Lane Keep Assist") correction, and for which the input of the curvature is neglected, is therefore given by:

$$\dot{x} = (A + BK)x \quad \text{(Eq. 13)}$$

For this closed-loop system, a function defined as positive is sought $V(x) = x^T P x$ with $P = P^T$ and P a matrix defined as positive such that, for all $x \in \mathbb{R}^4$, the following condition is verified:

$$\frac{\partial V}{\partial t} < 0 \quad \text{(Eq. 14)}$$

Listing by time derivation of $V(x) = x^T P x$ starting from the equation Eq. 14, the series of equivalences hereinbelow are obtained:

$$\dot{x}^T P x + x^T P \dot{x} < 0 \Leftrightarrow (A_c x)^T P x + x^T P A_c x < 0 \Leftrightarrow$$

$$x^T (A + BK)^T P x + x^T P (A + BK) x < 0 \Leftrightarrow$$

$$x^T [(A + BK)^T P + P(A + BK)] x < 0 \quad \text{(Eq. 15)}$$

The initial inequality is therefore satisfied, if the following matrix inequality is satisfied.

$$\dot{x}^T P x + x^T P \dot{x} < 0 \Leftrightarrow$$

$$(A + BK)^T P + P(A + BK) \prec 0 \quad \text{(Eq. 16)}$$

The matrix inequality of the equation Eq. 16 may be re-formulated by virtue of the following change of variable:

$$Y = KP^{-1} = KQ, \text{ where } P^{-1} = Q. \quad \text{(Eq. 17)}$$

By applying this change of variable, the final form of the matrix equation is obtained $$QA^T + Y^T B^T + AQ + BY < 0 \quad \text{(Eq. 18)}$$

In addition, it assumed that the LKA corrective action starts for a state of the vehicle contained within an initial region, corresponding to the set described by the following limits:

$$|\beta| \leq \beta^N, |r| \leq r^N, |\psi_L| \leq \psi_L^N, |y_L| \leq y_L^N \quad \text{(Eq. 19)}$$

The apices of this set are given by:

$$z_i = [\pm \beta^N, \pm r^N, \pm \psi_L^N, \pm y_L^N]^T \quad \text{(Eq. 20)}$$

The function sought is therefore found by resolving the following problem of LMI (for "Linear Matrix Inequalities") optimization:

$$\min \text{trace}(Q) \text{ or } \det(Q) \quad \text{(Eq. 21)}$$

$$QA^T + Y^T B^T + AQ + BY < 0$$

$$\begin{pmatrix} 1 & (z_i^N)^T \\ z_i^N & Q \end{pmatrix} > 0, i = 1, \ldots, 8$$

The system described hereinabove guarantees that each path of the system beginning within the initial region remains within an invariant set limited to this initial region.

The link of this invariant set with the position on the lane of the two front wheels of the vehicle is written in the following manner:

$$y_g = y_L + (l_f - l_S)\psi_L + \frac{a}{2} \text{ and} \quad (Eq. 22)$$

$$y_d = y_L + (l_f - l_S)\psi_L - \frac{a}{2}$$

By geometrical construction, the two front wheels of the vehicle are located on a strip of width 2d centered on the lane. The following dual condition must therefore be satisfied.

$$y_g \le d \text{ and } y_d \ge -d \quad (Eq. 23)$$

The dual condition of the equation Eq. 23 may be reformulated in the following manner:

$$-d + \frac{a}{2} \le y_L + (l_f - l_S)\psi_L \le d - \frac{a}{2} \quad (Eq. 24)$$

The invariant set obtained in the space situated between two parallel equation hyperplanes, each corresponding to one of the in equations of the equation Eq. 24, is subsequently included.

The maximum strip on the lane within which the front wheels of the vehicle will remain during the correction LKA is therefore described by the following system of equations:

$$d^{maxer} = \frac{1}{2}(\sqrt{(fQf^T)} + a)$$

$$\text{or } f = [0, 0, 2(l_f - l_S), 2] \quad (Eq. 25)$$

In addition, if any given initial activation position x0 is considered, the maximum displacement d(x0) over the lane is given by the following equation:

$$d(x_0) = \frac{1}{2}((x_0^T(Q)^{-1}x_0)(fQf^T) + a) \quad (Eq. 26)$$

The detection means 2 determines the maximum lateral displacement Dmax of the vehicle over the lane by applying the principles for detection of the lateral obstacles described hereinabove. Thus, for a calculated state feedback K and an initial position at the time of the activation x0, the maximum lateral displacement over the lane of the vehicle d(x0) is determined by application of the equation Eq. 26.

In the following, it will be assumed that a set of gains Ki has been calculated offline by a pole placement method or another systems control method for responses that are more or less dynamic (returns to the lane center which take place more or less rapidly) of the vehicle. These gains are stored in a non-volatile memory onboard the vehicle for a use in real time.

The operation of the decision means 3 will now be described.

The decision means 3 generates a request for correction activation as a function of the position of the vehicle on the traffic lane with respect to the maximum lateral displacement of the vehicle over the lane determined by the detection means 2.

The decision means 3 is designed to operate according to two possible modes able to be selected by the driver.

In a first mode, the decision means 3 generates an activation request when a lateral collision is imminent.

In a second mode, the decision means 3 generates an activation request when the lateral marking is crossed. This second mode of operation corresponds to the operation of a LKA device. It will not therefore be described here.

In the first mode of operation, the request for activation of a right side, respectively left side, correction is generated only if there is an obstacle on the right side, respectively left side. Here are a few examples which illustrate this operation:

If the car drifts to the left side and if there is an obstacle on the left side, a triggering of the correction will take place. In another embodiment, the use of the direction indicator will be interpreted as a desire to change lane and the assistance will not be triggered.

If the car drifts to the left side and if there is no obstacle on the left side, the correction is not triggered. In another embodiment, the use of the direction indicator will be interpreted as a desire to change lane and the assistance will not be triggered in any case.

If the car drifts to the left side and there is no obstacle on the left side but if there is an obstacle on the right side, the correction is not triggered. In another embodiment, the use of the direction indicator will be interpreted as a desire to change lane and the assistance will not be triggered in any case.

The operation of the decision means 3 will now be more precisely described.

In real time, with the equation 26, the maximum displacement over the lane d(x0)$_i$ is calculated for an instantaneous activation request for each gain Ki. The gains Ki are calculated as previously mentioned by the pole placement control method or another systems control method.

At each time segment, from amongst the gains Ki, gains Kj are stored corresponding to a value of lateral displacement d(x0)j lower than the value of maximum lateral displacement on the left-hand side of the lane Dmax_g, which value comes from the detection means and from the associated algorithms.

At each time segment, from amongst the gains Ki, gains Kj are stored corresponding to a value of lateral displacement d(x0)j lower than the value of maximum lateral displacement on the right-hand side of the lane Dmax_d, which value comes from the detection means and from the associated algorithms.

At each time segment, from amongst the gains Ki, gains Kp are stored corresponding to a value of lateral displacement d(x0)p lower than a maximum distance with respect to the lane center. It may for example be equal to one lane width.

The more the vehicle deviates with respect to the center of the lane, the more the set of gains Kj and Kp is reduced, since only the very high gains are capable of correcting a departure from the lane without the position of the vehicle exceeding the value of maximum lateral displacement on the right side of the lane Dmax_d, or a value of maximum lateral displacement on the left side of the lane Dmax_g. These very severe corrections must, in no case, put the car in a skid situation and, for this purpose, in the phase of calibration of the system, tests for road holding and dynamic behavior of the vehicle will be carried out by test drivers. The maximum lateral acceleration that could be applied to the car and that will be acceptable from the customer service point of view should also be experimentally determined. For a significant deviation, at a given moment in time, only one corrective gain remains from amongst the sets of gains Kj and Kp.

In a first mode of operation of the decision means 3, the request for activation of the correction is generated for a deviation to the left, respectively to the right, when, from amongst the gains Kj, only one gain remains; The remaining gain is transmitted to the intervention means 4 in order for the correction to be executed.

In a second mode of operation of the decision means 3, the request for activation of the correction is generated when, from amongst the gains Kp, only one gain remains. The remaining gain is transmitted to the intervention means 4 in order for the correction to be executed.

In any case, the system then aims at a delayed correction, which does not bother the driver, but which avoids the departure from the lane.

The intervention means 4 will now be described. After receiving the request for activation of a correction sent by the decision means 3, the intervention means 4 controls the correction according to the type of steering means equipping the vehicle.

The correction may be sent to a means for calculating the steering angle in relation with the steering of the vehicle, if the vehicle disposes of a power steering with closed-loop control on the steering angle by an onboard processor. The correction then takes the form of a steering angle setpoint calculated according to the equation 11 with the gain K given by the gain Kj, respectively the gain Kp, retained.

The correction may be sent to a means for controlling the power-assisted steering and takes the form of a steering torque setpoint, if the vehicle disposes of a power steering with closed-loop control on the steering torque by an onboard processor. In this case, by application of the equation Eq. 11, the decision means 3 determines a setpoint steering angle, to be sent to a digital regulator of the PID (Proportional Integral Derivative) type, for example, which provides a closed-loop control of the steering torque as a function of the error between the setpoint steering angle and the measured steering angle.

The control system described hereinabove only requires limited real-time processing volume, both for the detection of the obstacles and for the determination of the correction.

Taking into account the lateral obstacles allows the acceptability of the LKA function by the drivers who only wish to be assisted in the case of imminent danger to be considerably improved.

The invention claimed is:

1. A system for controlling steering means of an automobile vehicle in case of an imminent collision with an obstacle, the vehicle comprising a system configured to locate the vehicle with respect to a traffic lane and to determine a lateral shift with respect to a center of the traffic lane at a sighting distance and a relative heading angle of the vehicle, a means of determination associated with sensors, configured to determine, in real time, a presence of obstacles, in a lateral position with respect to the vehicle, and/or in a frontal position and in relative movement toward the vehicle, a 3-axis rate sensor configured to measure a speed of rotation of the vehicle, a steering means of the vehicle configured to be controlled in steering angle as a function of a measurement from a steering angle sensor or a steering means of the vehicle configured to be controlled in steering torque, the control system comprising:
detection means for assessing the position of the obstacles and determining a maximum lateral distance available for movement of the vehicle with respect to the obstacles;
decision means for generating a request for correction as a function of a path of the vehicle, and of the maximum lateral distance; and
intervention means for controlling the steering of the vehicle to correct the path of the vehicle,
in which the detection means is configured to determine the position of the obstacles by shape recognition, then to determine a lateral displacement distance of the vehicle as a function of the rate of yaw, of the relative heading angle between the axis of the vehicle and the tangent to the reference path, of the lateral shift between the axis of the vehicle and the tangent to the path in front of the vehicle, of the drift angle, of the distance from the center of gravity to the front axle, and of the sighting distance for the measurement of the lateral shift in front of the vehicle, and
in which the decision means is designed to determine position correction gains, to store a first set from amongst the position correction gains corresponding to a value of lateral displacement lower than a value of maximum lateral displacement on the left side of the lane, to store a second set from amongst the position correction gains corresponding to a value of lateral displacement lower than a value of maximum lateral displacement on the right side of the lane, and to generate the request for activation of the correction for a deviation to the left, respectively to the right, when from amongst the first or the second set of gains, only one gain remains, the remaining gain being transmitted to the intervention means in order for the correction to be executed.

2. The control system as claimed in claim 1, in which the decision means is configured to generate a request of activation of a correction as a function of the position of the vehicle on the traffic lane with respect to the maximum lateral displacement of the vehicle on the lane determined by the detection means.

3. A control system for controlling steering means of an automobile vehicle in case of an imminent collision with an obstacle, the vehicle comprising a system configured to locate the vehicle with respect to a traffic lane and to determine a lateral shift with respect to a center of the traffic lane at a sighting distance and a relative heading angle of the vehicle, a means of determination associated with sensors, configured to determine, in real time, a presence of obstacles, in a lateral position with respect to the vehicle, and/or in a frontal position and in relative movement toward the vehicle, a 3-axis rate sensor configured to measure a speed of rotation of the vehicle, a steering means of the vehicle configured to be controlled in steering angle as a function of a measurement from a steering angle sensor or a steering means of the vehicle configured to be controlled in steering torque, the control system comprising:
detection means for assessing the position of the obstacles and determining a maximum lateral distance available for movement of the vehicle with respect to the obstacles;
decision means for generating a request for correction as a function of a path of the vehicle, and of the maximum lateral distance; and
intervention means for controlling the steering of the vehicle to correct the path of the vehicle,
in which the detection means is configured to determine the position of the obstacles by shape recognition, then to determine a lateral displacement distance of the vehicle as a function of the rate of yaw, of the relative heading angle between the axis of the vehicle and the tangent to the reference path, of the lateral shift between the axis of the vehicle and the tangent to the path in front of the vehicle, of the drift angle, of the distance from the center of gravity to the front axle, and of the sighting distance for the measurement of the lateral shift in front of the vehicle, and
in which the decision means is designed to determine position correction gains, to store a set from amongst the position correction gains corresponding to a value of lateral displacement lower than a maximum distance with respect to the lane center, and to generate the request for activation of the correction when, from amongst the gains of the set, only one gain remains, the remaining gain being transmitted to the intervention means in order for the correction to be executed.

4. The control system as claimed in claim 1, in which the intervention means is configured to control the correction of the path of the vehicle as a function of the gain received from the decision means, the correction being sent to a means for calculating the steering angle in relation with the steering of the vehicle in the form of a steering angle setpoint or, the correction is sent to a means for controlling the assistance to the steering in the form of a steering torque setpoint.

5. A system for controlling steering of an automobile vehicle in case of an imminent collision with an obstacle, the vehicle comprising a system configured to locate the vehicle with respect to a traffic lane and to determine a lateral shift with respect to a center of the traffic lane at a sighting distance and a relative heading angle of the vehicle, and configured to determine, in association with sensors and in real time, a presence of obstacles, in a lateral position with respect to the vehicle, and/or in a frontal position and in relative movement toward the vehicle, a 3-axis rate sensor configured to measure a speed of rotation of the vehicle, a steering of the vehicle configured to be controlled in steering angle as a function of a measurement from a steering angle sensor or the steering of the vehicle configured to be controlled in steering torque, the control system comprising one or more processors configured to:

assess the position of the obstacles and determine a maximum lateral distance available for movement of the vehicle with respect to the obstacles;

generate a request for correction as a function of a path of the vehicle, and of the maximum lateral distance; and control the steering of the vehicle to correct the path of the vehicle, in which the control system is configured to determine the position of the obstacles by shape recognition, then to determine a lateral displacement distance of the vehicle as a function of the rate of yaw, of the relative heading angle between the axis of the vehicle and the tangent to the reference path, of the lateral shift between the axis of the vehicle and the tangent to the path in front of the vehicle, of the drift angle, of the distance from the center of gravity to the front axle, and of the sighting distance for the measurement of the lateral shift in front of the vehicle, and in which the control system is designed to determine position correction gains, to store a first set from amongst the position correction gains corresponding to a value of lateral displacement lower than a value of maximum lateral displacement on the left side of the lane, to store a second set from amongst the position correction gains corresponding to a value of lateral displacement lower than a value of maximum lateral displacement on the right side of the lane, and to generate the request for activation of the correction for a deviation to the left, respectively to the right, when from amongst the first or the second set of gains, only one gain remains, the correction to be executed based on the remaining gain.

6. The control system as claimed in claim 5, in which the control system is configured to generate a request of activation of a correction as a function of the position of the vehicle on the traffic lane with respect to the maximum lateral displacement of the vehicle on the lane determined by the control system.

7. The control system as claimed in claim 5, in which the control system is configured to control the correction of the path of the vehicle as a function of the gain, the correction being utilized to calculate the steering angle in relation with the steering of the vehicle in the form of a steering angle setpoint or, the correction being utilized to control the assistance to the steering in the form of a steering torque setpoint.

* * * * *